United States Patent [19]

Joo et al.

[11] Patent Number: 5,789,113
[45] Date of Patent: Aug. 4, 1998

[54] ACTIVE MATERIAL FOR NICKEL ELECTRODE AND NICKEL ELECTRODE HAVING THE SAME

[75] Inventors: Kyu-nam Joo, Seoul; Jong-seo Choi, Kyungki-do; Kwi-seuk Choi; Geun-bae Kim, both of Seoul; Sang-won Lee, Kyungki-do, all of Rep. of Korea

[73] Assignee: Samsung Display Devices Co., Ltd., Kyungki-do, Rep. of Korea

[21] Appl. No.: 690,838

[22] Filed: Aug. 1, 1996

[30] Foreign Application Priority Data

Nov. 17, 1995 [KR] Rep. of Korea ............ 95-41851

[51] Int. Cl.$^6$ ............................................. H01M 4/52
[52] U.S. Cl. ............................................. 429/223; 429/232
[58] Field of Search ............ 423/420.2; 429/223, 429/232

[56] References Cited

U.S. PATENT DOCUMENTS 3,912,775  10/1975  Broecker et al. .......... 423/420.2 X
5,514,497  5/1996   Furukawa ................... 429/232 X
5,518,704  5/1996   Kelkar et al. ............. 423/420.2 X Primary Examiner—Stephen Kalafut
Attorney, Agent, or Firm—Leydig, Voit & Mayer, Ltd.

[57] ABSTRACT

An active material for a nickel electrode includes a double hydroxycarbonate having the formula $Ni_{1-2x}M_{2x}(OH)_2(CO_3)_x \cdot nH_2O$, where $0.05 < x < 0.2$, $0.05 < n < 4$, and M is a Group IIIB element and containing 1–40 at % of a III B group element in a solid solution, based on the weight of nickel, and 1–20 wt % of a conductive enhancer which is at least one substance selected from the group consisting of Co and cobalt compound, based on the weight of the double hydroxycarbonate, so that a nickel electrode having a high capacity, increased life time, high charge/discharge velocity and enhanced utility of the active material can be produced. Alkaline secondary cells can be manufactured using the nickel electrode.

6 Claims, 6 Drawing Sheets

ACTIVE MATERIAL FOR NICKEL ELECTRODE AND NICKEL ELECTRODE HAVING THE SAME

BACKGROUND OF THE INVENTION

The present invention relates to an active material for a nickel electrode and a nickel electrode having the same, and more particularly, to a new active material for a nickel electrode having enhanced utility of the active material, and nickel electrode having high capacity, increased life time, high charging and discharging velocity, by employing the active material.

A nickel electrode for an alkaline secondary cell comprises a porous nickel current collector having a number of pores and an active material filling the pores, and is generally manufactured by a sintering method.

In this method, the porous nickel current collector is made by coating a nickel-plated steel strip with a slurry containing nickel powder as a main component, and drying and sintering the slurry-coated strip. Then, an active material containing nickel hydroxide is precipitated, chemically or electrochemically, to the pores of the nickel current collector, and the resultant electrode is treated in an alkaline solution, to produce a nickel electrode. According to this method, the active material and the current collector are strongly bonded and contacted with each other electrochemically over a large area, so that a nickel electrode having high utility of the active material, good high-rate charging and discharging characteristics, and a long lifetime can be manufactured.

The sintering method, however, suffers from a complex manufacturing process and high cost, since a complex impregnation process of the active material is usually repeated several times. Moreover, the porosity of the current collector is 80% at most and thus the energy density of an electrode produced according to the sintering method is relatively low.

As an effort to overcome the above problems, a paste method has been increasingly used. In this method, a positive active material, which is a paste mixture of a conductive material and a binding material, is sprayed or coated on the surface of the porous nickel current collector such as nickel foam and nickel felt, and dried, to produce an electrode. As described above, in this method, since the pores of the porous nickel current collector are directly filled with the active material in a paste state, the contact area between the active material and the current collector is smaller than that in the sintered nickel electrode. Also, a high density nickel hydroxide is used as an active material, which obstructs diffusion of hydrogen ions into the active material crystals. Thus, the utility of the active material is low. However, according to the paste method, the manufacturing process is simple and an electrode with high density can be manufactured.

During charging and discharging, a reaction at the nickel electrode takes place as follows.

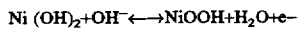

The reaction is caused by transfer of hydrogen ions in the active material crystal accompanied by an electron transfer. During the charging process, $OH^-$ of an electrolyte is transferred. During the discharging process, $H^+$ of $H_2O$ is diffused from the surface of the active material into the crystal, to reduce $Ni^{+3}$ to $Ni^{+2}$.

In the nickel electrode, charging velocity is determined by the diffusion velocity of $H^+$. This charging process is shown in stages as follows.

(1) generation of $H^+$ (by electron transfer at the interface between the current collector and the active material):

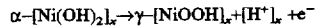

(2) $H^+$ transfer (by local density variation) from a location x within the plate to the plate surface s:

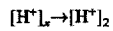

(3) generation of $H_2O$ (by reacting $H^+$ with $OH^-$ in an electrolyte):

(4) transfer of $OH^-$ from within the electrolyte at a location b to the interface i with the plate:

(5) generation of $[H^+]$ and $[OH^-]$ by hydrolysis (ionic balance)

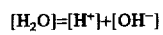

(6) absorption of $H^+$ into the cathode

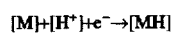

Overvoltage of a nickel electrode during the charging process is affected by the diffusion velocity of protons in the crystal and the lattice distortion, which takes place when other positive ions are added to the active material.

During a charging and discharging process, the crystalline structure of a nickel hydroxide undergoes a serious change. Generally, the structure of the nickel hydroxide varies with the manufacturing method thereof. For instance, nickel hydroxide which is chemically produced in an aqueous solution is $\beta$-$Ni(OH)_2$ and has a hexagonal structure.

Nickel hydroxide which is electrochemically produced $\alpha$-$Ni(OH)_2$ and has a hexagonal structure, is the same structure as that of $\beta$-$Ni(OH)_2$ except for a longer c-axis.

In $\beta$-$Ni(OH)_2$ and $\beta$-NiOOH formed from $\beta$-Ni(OH) by charging, the length of the c-axis is 4.6–4.8Å because other ions and the $H_2O$ are not interleaved between main layers. Accordingly, during the charging reaction between $\beta$-Ni$(OH)_2$ and $\beta$-NiOOH, since hydrogen ions are only absorbed to or dissociated from the interlayer, there is no change in structure and volume.

On the other hand, in $\alpha$-$Ni(OH)_2$ and $\gamma$-NiOOH, $H_2O$ and positive ions can exist in the interlayer of the corresponding crystal and the length of the c-axis is 7–8 Å. $\gamma$-NiOOH is produced by inserting $H_2O$ or positive ions into the interlayers of $\beta$-NiOOH during the overcharging process, and is converted into $\alpha$-$Ni(OH)_2$ having a structure similar to that of $\gamma$-NiOOH during a discharging process. $\alpha$-$Ni(OH)_2$ is transformed into $\beta$-$(Ni(OH)_2$ of high density by a chemical reaction, accompanied by a serious change in volume. Thus, the electrochemical reaction between $\beta$-$Ni(OH)_2$ and $\beta$-NiOOH is generally in a secondary cell, since little structural difference between $\beta$-$Ni(OH)_2$ and $\beta$-NiOOH is found and since they are stable in an electrolyte solution.

However, since nickel hydroxide is an insulating material, during the discharging process, nickel hydroxide is discharged to the extent of an oxidation number of 2.2–3.0, not completely discharged to an oxidation number of 2.0. Further, nickel hydroxide is, when overcharged, oxidized to an oxidation number of 3.0 or more, i.e., about 3.7; and thus a highly oxidized form of γ-NiOOH is produced. Formation of γ-NiOOH with a low density results in swelling of the electrode and thus falling-off of the active material from a current collector.

In an attempt to solve this problem, nickel hydroxide comprising magnesium (Mg) or zinc (Zn) in a solid solution as an active material has been disclosed. In this method, as the space for proton transfer is secured through the transformation of the lattice structure of nickel hydroxide and the conductivity of the active material is enhanced, the transfer of electrons becomes active and the generation of γ-NiOOH is prevented.

However, according to this method, a metal such as Zn or Mg is added in an amount of 10–20 wt % based on the weight of the nickel hydroxide and thus the amount of nickel hydroxide as a main component of the active material is relatively reduced, so that cell capacity is considerably reduced. In addition, during the repeated charging and discharging processes, it is almost impossible to completely suppress the generation of γ-NiOOH.

It is reported that cell capacity is 30% larger in a cell using the electrode reaction of α-Ni(OH)$_2$←→γ-NiOOH than that in a cell using the electrode reaction of β-Ni(OH)$_2$←→β-NiOOH.

The present invention refers to a cell using an electrode reaction of α-Ni(OH)$_2$←→γ-NiOOH through the stabilization of α-Ni(OH)$_2$ by adding a metal, without suppression of γ-NiOOH generation, in order to manufacture a nickel electrode having a high capacity.

SUMMARY OF THE INVENTION

The object of the present invention is to provide an active material for a nickel electrode having enhanced utility of the active material.

Another object of the present invention is to provide a nickel electrode having high capacity, increased life time, and high charging and discharging velocities.

The above first object of the present invention is achieved by an active material for an electrode comprising a double hydroxycarbonate containing 1–40 at % of a III B group element in a solid solution, based on the weight of nickel, and 1–20 wt % of a conductive enhancer which is at least one substance selected from the group consisting of Co and cobalt compound, based on the weight of the double hydroxycarbonate.

The above double hydroxycarbonate has the structural formula of $Ni_{1-2x}M_{2x}(OH)_2(CO_3)_x \cdot nH_2O$ where $0.05 \leq X \leq 0.2$, $0.05 \leq n \leq 4$, and M is an element selected from the group consisting of Al, Ga, In and Tl.

The above second object of the present invention is achieved by a nickel electrode comprising a porous nickel current collector and an active material filling the pores thereof, the active material comprising a double hydroxycarbonate containing 1–40 at % of a III B group element in a solid solution, based on the weight of nickel, and 1–20 wt % of a conductive enhancer which is at least one substance selected from the group consisting of Co and cobalt compound, based on the weight of the double hydroxycarbonate.

BRIEF DESCRIPTION OF THE DRAWINGS

The above object and other advantages of the present invention will become more apparent by describing in detail a preferred embodiment of the present invention with reference to attached drawings in which.

DETAILED DESCRIPTION OF THE INVENTION

Figure 1:
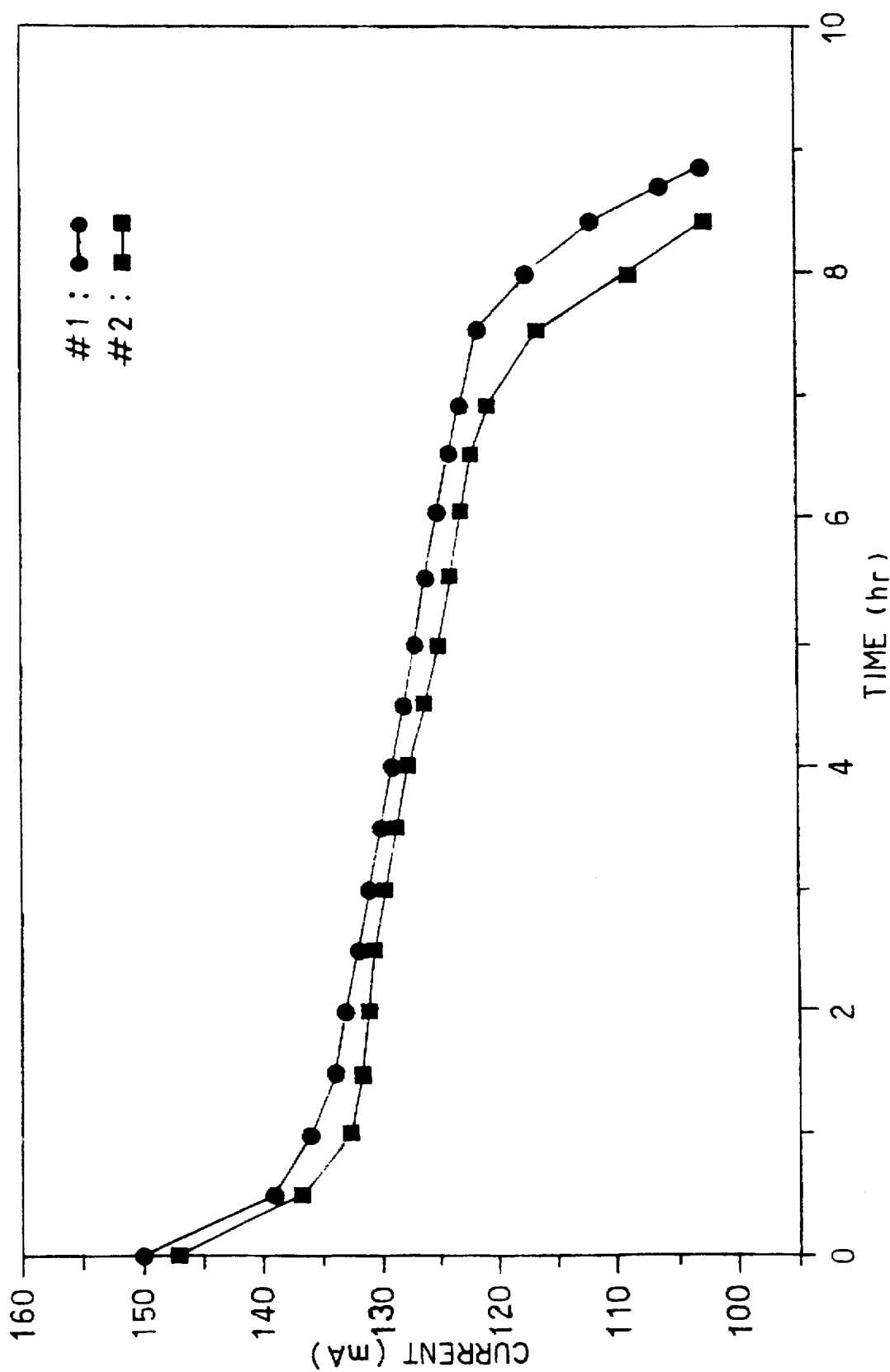
FIG. 1 is a graph showing the discharging characteristic of cells manufactured according to an embodiment of the present invention and of the prior art.
Figure 2:
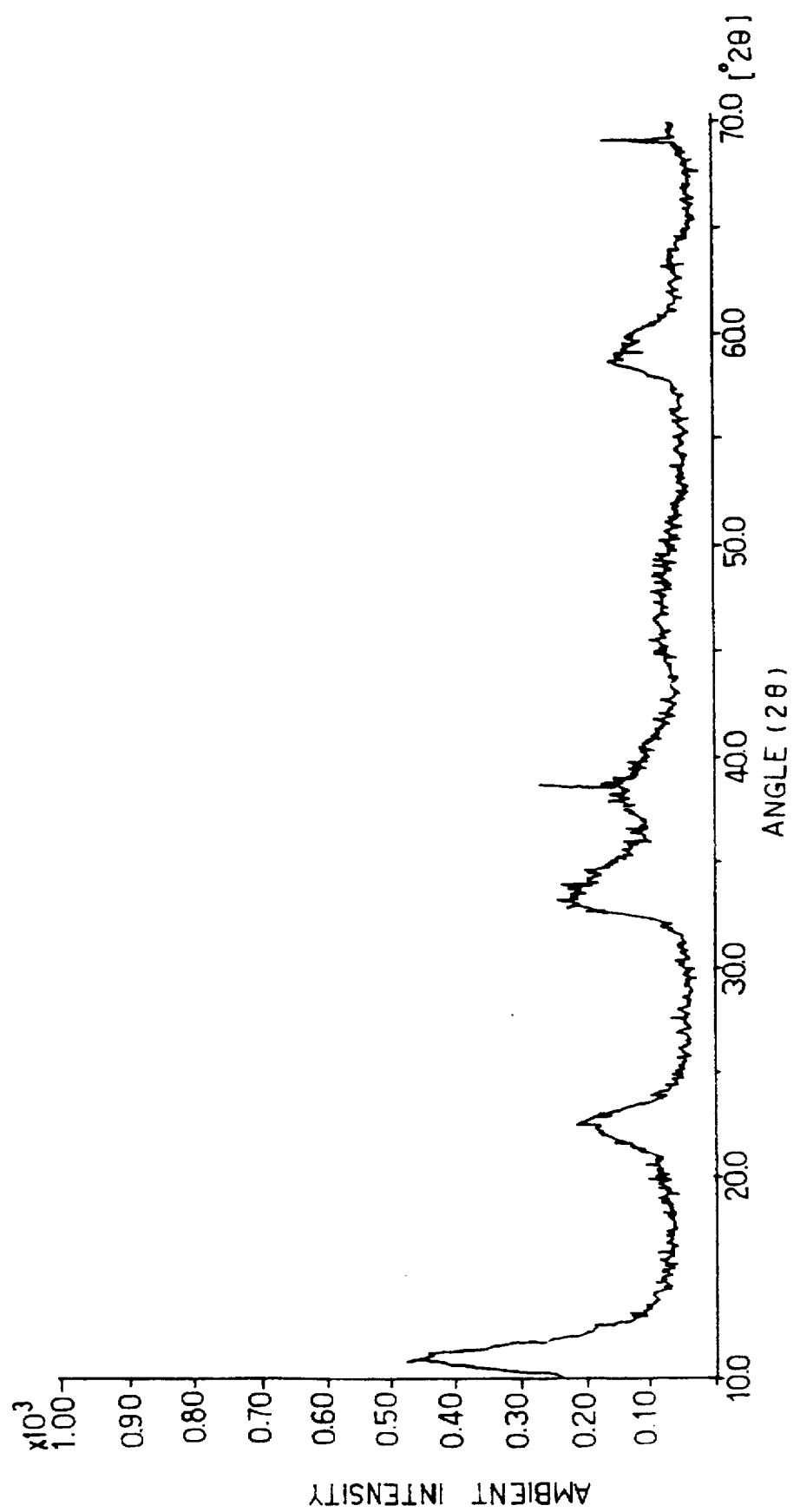
FIG. 2 illustrates the results of X-ray diffraction analysis of a double hydroxycarbonate manufactured according to another embodiment of the present invention.
Figure 3:
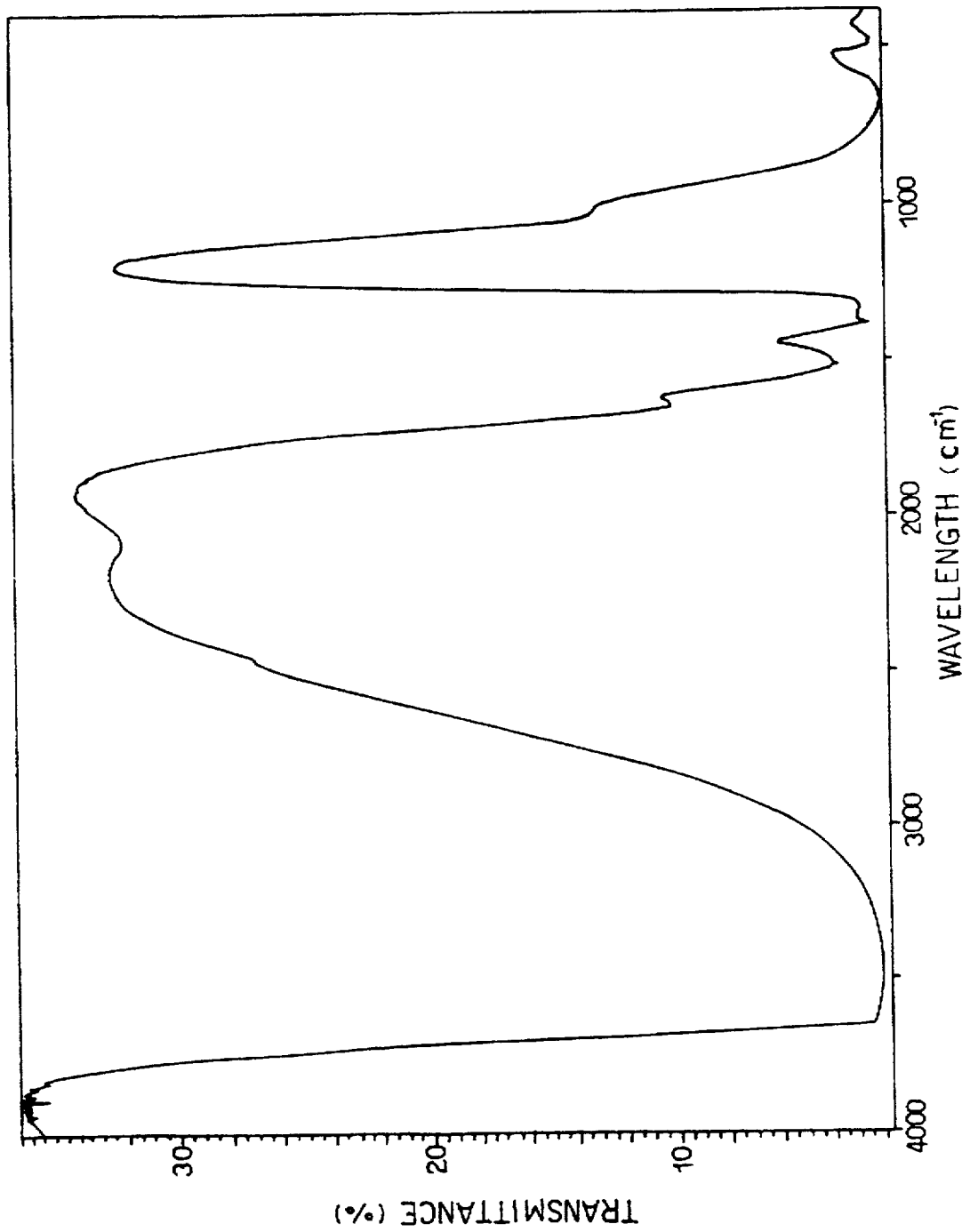
FIG. 3 illustrates the results of IR diffraction analysis of a double hydroxycarbonate manufactured according to another embodiment of the present invention.
Figure 4:
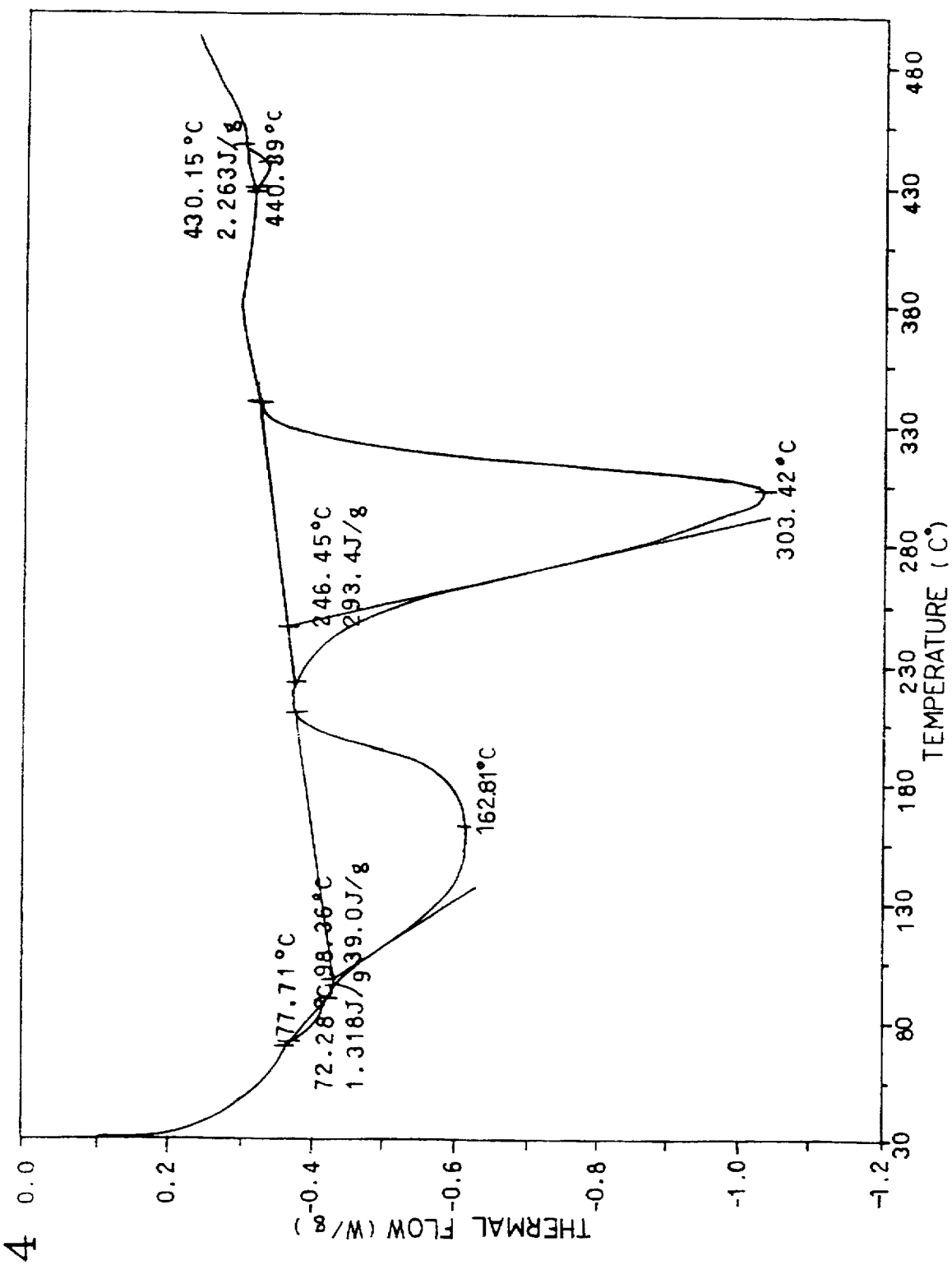
FIG. 4 illustrates the results of DSC analysis of a double hydroxycarbonate manufactured according to another embodiment of the present invention.
Figure 5:
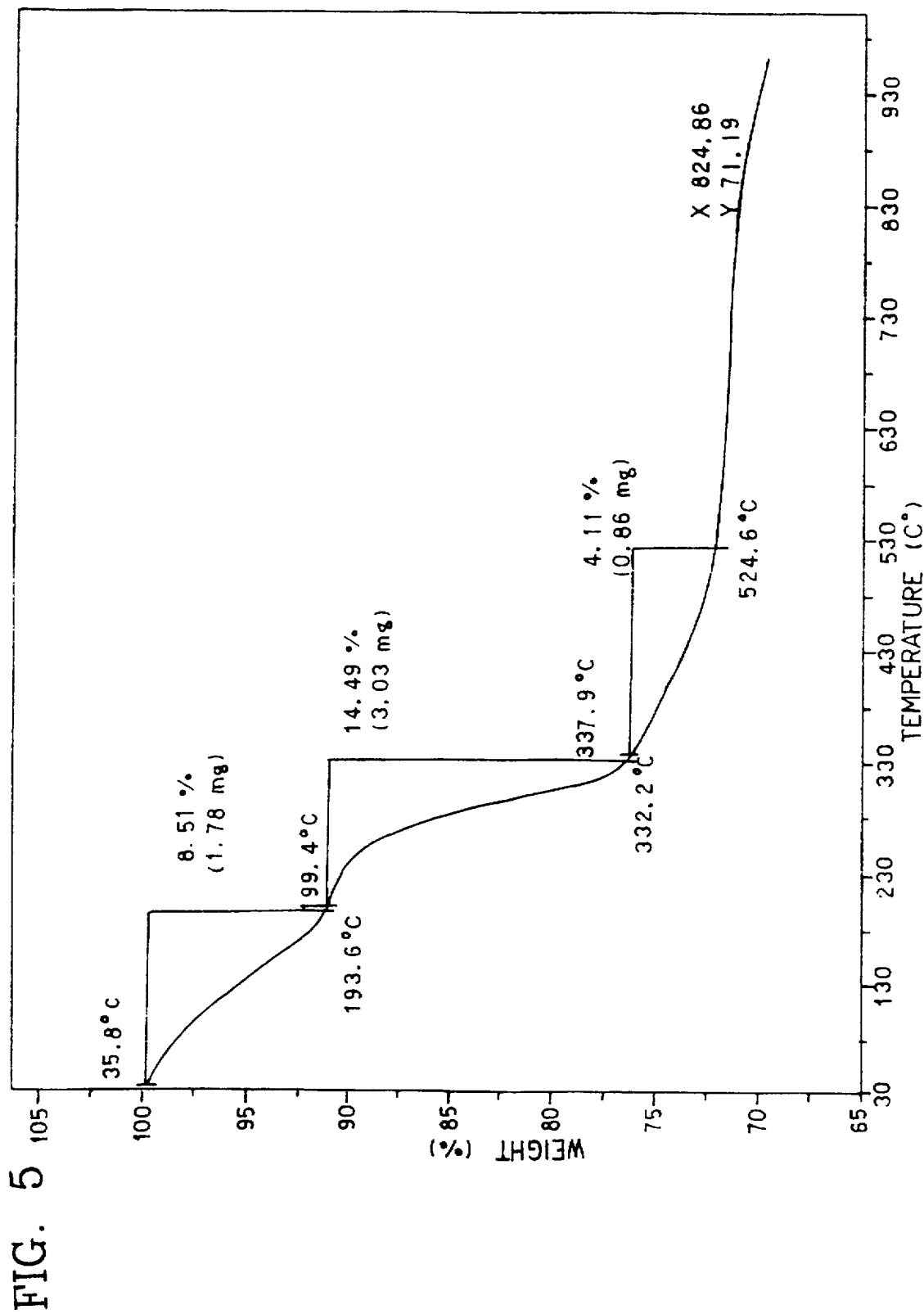
FIG. 5 illustrates the results of TG analysis of a double hydroxycarbonate manufactured according to another embodiment of the present invention.
Figure 6:
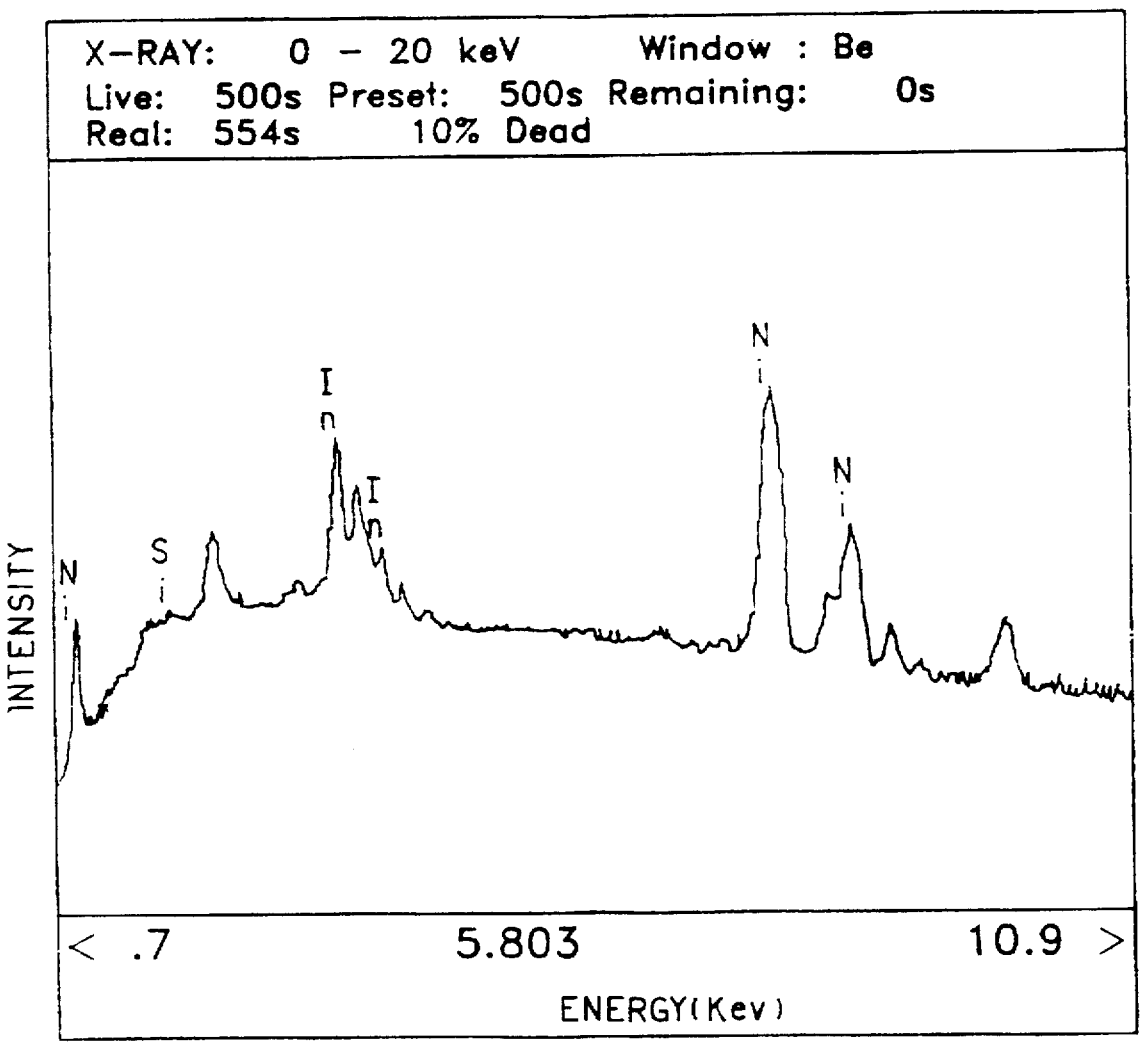
FIG. 6 illustrates the results of EDAX analysis of a double hydroxycarbonate manufactured according to another embodiment of the present invention.

In this invention, during charging and discharging, an electrode reaction of α-Ni(OH)$_2$←→γ-NiOOH occurs to cause a great change in the oxidation number of nickel (i.e., the number of electrons exchanged per nickel atom), thereby improving the capacity per unit weight of a cell. A double hydroxycarbonate in accordance with the present invention has the structural formula of $Ni_{1-2x}M_{2x}(OH)_2(CO_3)_x \cdot nH_2O$, wherein $0.05 \leq X \leq 0.2$, $0.05 \leq n \leq 4$ and the metal M is an element selected from the III B group elements. Here, the amount of the metal is 1–40 at % based on the weight of nickel. In the double hydroxycarbonate, $[Ni_{1-2x}M_{2x}(OH)_2]^{x+}$ cations form a main layer and the carbonate anions and $H_2O$ molecules are interleaved between the main layers, to thus form a succession of layers including $[Ni_{1-2x}M_{2x}(OH)_2]^{x+}$ cations and $[CO_3^{2-} \cdot nH_2O]^{x-}$ anions.

Since the average particle size of the active material used in the present invention is less than 10 μm and a current collector has a pore size of 300–500 μm, isolated active material is abundant in plates packed with the active material. The active material as such is an insulating material. Thus, if the active material is isolated, electron transfer between the active materials is difficult, which lowers the electrochemical reaction between the active materials. Accordingly, to form an effective path of electrons between the isolated active materials, Cobalt or cobalt compound is added to the active material, resulting in enhancing the conductivity of the active material.

Cobalt compound used in the present invention is selected from the group consisting of α-Co(OH)$_2$, β-Co(OH)$_2$ and CoO. As an example, the conductive mechanism of CoO will be described with reference to the below formula (1).

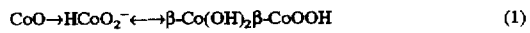
CoO→HCoO$_2^-$←→β-Co(OH)$_2$β-CoOOH   (1)

If CoO is dissolved in a strong alkaline solution, it is converted into a blue complex ion (HCoO$_2^-$) which is precipitated to β-Co(OH)$_2$ at the surface of the active material. During the charging process, the β-Co(OH)$_2$ is irreversibly converted into β-CoOOH having good conductivity, which forms a conductive network inside the current collector and serves as a link between the active materials.

The utility of the active material increases in the order of CoO〉 α-Co(OH)$_2$〉 β-Co(OH)$_2$] which corresponds to the oxidation ability to β-CoOOH by oxygen in the atmosphere or the solubility in a strong alkaline solution.

To effectively form a conductive network using the conductive enhancer, it is required to stand the electrode in an electrolyte solution. At this time, the effect of standing the electrode in the electrolyte solution varies with time and temperature. Where CoO is used as a conductive enhancer, if the electrode is left more than one day at a temperature of 50° C. or more than five days at a temperature 20° C., CoO is almost dissolved and precipitated, such that very little CoO remains. The less CoO remains, the more effectively a conductive network is formed.

Hereinbelow, a method for manufacturing a nickel electrode in accordance with the present invention is described in detail.

A mixed aqueous solution of nickel nitrate and metal nitrate, chosen from the nitrates of Al, Ga, In or Tl and having a mole ratio of nickel nitrate to metal nitrate of about 1.0:0.01, to about 1.0:1.0, preferably about 1.0:0.01 to about 1.0:0.67, is dropped into a mixed solution of sodium hydroxide (NaOH) and sodium carbonate ($Na_2CO_3$) (NaOH/$Na_2CO_3$: 20/1–2/1 in wt/wt), and the pH of the obtained mixture is adjusted to 9–12, thus precipitating the double hydroxycarbonate crystal. The mole ratio of the mixture of metal nitrate and nickel nitrate to the mixture of NaOH and $Na_2CO_3$ is about 1:2 to about 1:4. The temperature of reaction mixture is maintained at a temperature of 35°±0.5° C. Generally, since the physical properties of double hydroxycarbonate depend upon the pH of the precipitating solution, it is necessary to pay attention to the adjusting pH of the precipitating solution.

A precipitate thus formed is washed until the pH of the filtrate is neutral, followed by drying for about 24 hours in a vacuum oven maintained at a temperature of 80° C. The dried product is pulverized to obtain a powder, and the powder is mixed with 1–20 wt % of cobalt compound, based on the weight of the double hydroxycarbonate, to form a paste. The paste is packed in a porous current collector and dried, to obtain a nickel electrode.

An alkaline secondary cell is manufactured using the nickel electrode in a usual method.

Hereinbelow, the preferred examples will be referred to in conjunction with a comparative example. However, the scope of the present invention is not limited to the below examples.

EXAMPLE 1

232.64g (0.8mol) of $Ni(NO_3)_2.6H_2O$, 200ml of 1M-Al$(NO_3)_3$ solution and $H_2O$ were mixed to obtain 1L of mixture solution (A). Separately, 35.71 g of sodium carbonate and 100.00 g of sodium hydroxide were dissolved in water to obtain 1L of mixture solution (B).

A mixture solution (A) was added to a mixture solution (B), to obtain a precipitate. At this time, the influx rate of the mixture solution (A) was constantly adjusted to 3.0±0.2 ml per minute by a reverse precipitation method. The temperature of reaction mixture was maintained at 35°±0.5° C., and the pH of the solution was maintained at 9 to 12.

The precipitation thus formed was washed until the pH of the filtrate was neutral, and then dried in an oven at a temperature of 80° C. until there was no change in the precipitate weight.

The thus-obtained double hydroxycarbonate was mixed to 12 wt % of CoO based on the weight of the double hydroxycarbonate, to form a paste. The paste was packed in a porous nickel current collector, and dried, to produce a nickel electrode.

An alkaline secondary cell (#1) was manufactured using the nickel electrode.

EXAMPLE 2

A nickel electrode was prepared following the same procedure as that of Example 1, except for using $In(NO_3)_3$ solution instead of $Al(NO_3)_3$ solution.

An alkaline secondary cell was manufactured using the nickel electrode.

COMPARATIVE EXAMPLE

A nickel hydroxide was mixed with 5 wt % of Zn based on the weight of the nickel hydroxide, to form a paste. The paste was packed in a porous nickel current collector, and dried, to produce a nickel electrode. An alkaline secondary cell (#2) was prepared using the nickel electrode.

The discharging characteristics of the cells produced according to Example 1 and the comparative example are illustrated in FIG. 1.

As can be seen from FIG. 1, the secondary cell capacity of Example 1 was 30% larger than that of comparative example. Also, the conductivity of the active material according to the present invention was better than that of the prior art. Accordingly, the secondary cell using the nickel electrode according to the present invention had higher charging and discharging velocity and a longer lifetime than the secondary cell using the nickel electrode according to the prior art.

FIGS. 2–6 show analysis results of the double hydroxycarbonate according to the present invention, for X-ray diffraction, IR diffraction, DSC, TG and EDAX analyses, respectively.

As described above, since the conductivity of double hydroxycarbonate according to the invention is ten times larger than that of the usual nickel hydroxide, the electrode having the active material has not only higher charging and discharging velocity but also better reversibility, thus preventing the active material from being eliminated from the current collector due to electrode expansion. As a result, the lifetime, a high-rate discharging characteristics and capacity of the electrode are improved.

A nickel electrode according to the invention can be used for an electrode for alkaline secondary cells such as those for an electric car and small household electrical appliances.

What is claimed is:

1. An active material for an electrode comprising a double hydroxycarbonate having the formula $Ni_{1-2x}M_{2x}(OH)_2$ $(CO_3)_x \cdot nH_2O$, where $0.05 \leq x \leq 0.2$, $0.05 \leq n \leq N4$, and M is a Group IIIB element and containing 1–40 at % of the Group IIIB element in a solid solution, based on the weight of nickel in the double hydroxycarbonate, and 1–20 wt %, based on the weight of the double hydroxycarbonate, of a conductivity enhancer which is at least one substance selected from the group consisting of cobalt and cobalt compounds.

2. The active material for a nickel electrode as claimed in claim 1, wherein M is selected from the group consisting of Al, Ga, In, and Tl.

3. The active material for a nickel electrode as claimed in claim 1, wherein said conductivity enhancer is a cobalt compound selected from the group consisting of α-Co(OH)$_2$, β-CO(OH)$_2$ and CoO.

4. A nickel electrode comprising a porous nickel current collector and an active material filling pores the current collector, wherein said active material comprises a double hydroxycarbonate having the formula $Ni_{1-2x}M_{2x}(OH)_2$ $(CO_3)_x \cdot nH_2O$, where $0.05 \leq x \leq 0.2$, $0.05 \leq n \leq 4$, and M is a Group IIIB element and containing 1–40 at % of the Group IIIB element in a solid solution, based on the weight of the nickel in the double hydroxycarbonate, and 1–20 wt %, based on the weight of the double hydroxycarbonate, of a conductivity enhancer which is at least one substance selected from the group consisting of cobalt and cobalt compounds.

5. The nickel electrode as claimed in claim 4, wherein M is selected from the group consisting of Al, Ga, In, and Tl.

6. The nickel electrode as claimed in claim 4, wherein said conductivity enhancer is a cobalt compound selected from the group consisting of $\alpha$-Co(OH)$_2$, $\beta$-CO(OH)$_2$, and CoO.

* * * * *

UNITED STATES PATENT AND TRADEMARK OFFICE
CERTIFICATE OF CORRECTION

PATENT NO. : 5,789,113
DATED : August 4, 1998
INVENTOR(S) : Joo et al.

It is certified that error appears in the above-identified patent and that said Letters Patent is hereby corrected as shown below:

Column 6, Line 47, change "$0.05 \leq n \leq N4$" to --$0.05 \leq n \leq 4$--;

Line 61, change "$\beta\text{-CO(OH)}_2$" to --$\beta\text{-Co(OH)}_2$

Column 8, Line 5, change "$\beta\text{-CO(OH)}_2$" to --$\beta\text{-Co(OH)}_2$--.

Signed and Sealed this

Fifteenth Day of December, 1998

*Attest:*

BRUCE LEHMAN

*Attesting Officer*    *Commissioner of Patents and Trademarks*